United States Patent
Hsu et al.

(10) Patent No.: US 11,489,988 B2
(45) Date of Patent: Nov. 1, 2022

(54) METHOD FOR REMOVING FOREIGN SUBSTANCES FROM A CAMERA SYSTEM USING VIBRATION OF PIEZOELECTRIC COMPONENT, AND CAMERA SYSTEM COMPRISING THE PIEZOELECTRIC COMPONENT

(71) Applicant: H.P.B. OPTOELECTRONICS CO., LTD., Taichung (TW)

(72) Inventors: Hsuan-Yueh Hsu, Taichung (TW); Yung-Chih Chen, Taichung (TW); Kuo-Chung Tung, Taichung (TW); Hsin-Cheng Chen, Taichung (TW)

(73) Assignee: H.P.B. OPTOELECTRONICS CO., LTD., Taichung (TW)

( * ) Notice: Subject to any disclaimer, the term of this patent is extended or adjusted under 35 U.S.C. 154(b) by 270 days.

(21) Appl. No.: 16/866,992

(22) Filed: May 5, 2020

(65) Prior Publication Data

US 2020/0358938 A1 Nov. 12, 2020

Related U.S. Application Data

(60) Provisional application No. 62/963,680, filed on Jan. 21, 2020, provisional application No. 62/895,029, (Continued)

(51) Int. Cl.
*H04N 5/225* (2006.01)
*B06B 1/02* (2006.01)
(Continued)

(52) U.S. Cl.
CPC ....... *H04N 5/22521* (2018.08); *B06B 1/0269* (2013.01); *B06B 1/06* (2013.01);
(Continued)

(58) Field of Classification Search
CPC .... H04N 5/225; H04N 5/2251; H04N 5/2252; H04N 5/22521; H04N 5/2253;
(Continued)

(56) References Cited

U.S. PATENT DOCUMENTS

| 9,383,540 B1 * | 7/2016 | Gandhi | G03B 17/55 |
| 2019/0033690 A1 * | 1/2019 | Choi | H04N 5/2257 |
| 2020/0346255 A1 * | 11/2020 | Robertson, Jr. | B60S 1/56 |

FOREIGN PATENT DOCUMENTS

| CN | 107852449 A | 3/2018 |
| JP | 2007082062 A | 3/2007 |

* cited by examiner

*Primary Examiner* — Twyler L Haskins
*Assistant Examiner* — Akshay Trehan
(74) *Attorney, Agent, or Firm* — Muncy, Geissler, Olds & Lowe, P.C.

(57) ABSTRACT

A method for removing foreign substances from a camera system is provided. The camera system includes a camera device with a transparent cover having a piezoelectric component. First, a type of the foreign substances is identified based on temperature, an image captured by the camera system, and a voltage change of the piezoelectric component. A sequence of frequencies is applied to the piezoelectric component and a resonant frequency is acquired. Thereafter, the foreign substances are removed from the camera system. A vibration frequency and a vibration time period for the piezoelectric component are determined according to the identified type of the foreign substances. The vibration frequency is based on the resonant frequency. The piezoelectric component is driven with the vibration frequency and the vibration time period, such that at least a portion of the foreign substances are removed from the transparent cover through vibration of the piezoelectric component.

18 Claims, 9 Drawing Sheets

Related U.S. Application Data filed on Sep. 3, 2019, provisional application No. 62/843,596, filed on May 6, 2019.

(51) Int. Cl.

| | | |
|---|---|---|
| *B06B 1/06* | (2006.01) | |
| *B06B 3/02* | (2006.01) | |
| *G02B 27/00* | (2006.01) | |
| *G03B 17/08* | (2021.01) | |
| *G03B 17/55* | (2021.01) | |
| *G03B 17/56* | (2021.01) | |
| *B08B 7/00* | (2006.01) | |
| *B08B 7/02* | (2006.01) | |
| *B08B 3/02* | (2006.01) | |

(52) U.S. Cl.
CPC .............. *B06B 1/0644* (2013.01); *B06B 3/02* (2013.01); *G02B 27/0006* (2013.01); *G03B 17/08* (2013.01); *G03B 17/55* (2013.01); *G03B 17/56* (2013.01); *B08B 3/02* (2013.01); *B08B 7/0064* (2013.01); *B08B 7/02* (2013.01)

(58) Field of Classification Search
CPC .... H04N 5/2254; H04N 5/2257; G03B 17/02; G03B 17/08; G03B 17/55; G03B 17/56; G03B 2217/002; G02B 27/0006; B06B 1/0269; B06B 1/0276; B06B 1/0284; B06B 1/06; B06B 1/0644–0685; B06B 3/00; B06B 3/02; B08B 3/02; B08B 3/024; B08B 3/04; B08B 7/00; B08B 7/0035–0071; B08B 7/02
See application file for complete search history.

METHOD FOR REMOVING FOREIGN SUBSTANCES FROM A CAMERA SYSTEM USING VIBRATION OF PIEZOELECTRIC COMPONENT, AND CAMERA SYSTEM COMPRISING THE PIEZOELECTRIC COMPONENT

CROSS-REFERENCE TO RELATED APPLICATION

This application claims the benefit of US provisional patent application Ser. No. 62/843,596, filed May 6, 2019, US provisional patent application Ser. No. 62/895,029, filed on Sep. 3, 2019, and US provisional patent application Ser. No. 62/963,680, filed on Jan. 21, 2020. The entire contents of which are incorporated herein by reference.

BACKGROUND OF THE INVENTION

1. Field of the Invention

The disclosure relates to a method for removing foreign substances from a camera system and a camera system provided for the method. More particularly, the disclosure relates to a method using vibration of a piezoelectric component to remove foreign substances from a camera system and a camera system comprising the piezoelectric component.

2. The Prior Arts

Camera systems have been widely used in environment as surveillance cameras, electric car mirrors, and the like. However, when camera systems are used outdoors, they are more likely to be affected by foreign objects. For example, raindrops, snow, frost, muddy water, etc. may block the incident light. Therefore, the images captured by the camera systems are aggravated.

Patent Publication CN 107852449 A discloses a camera, with which water drops on the outer cover and the camera can be removed. The camera has a vibration device including a cylindrical PZT vibrator connected to the light-transmitting portion of the camera through a cylindrical vibration body. The vibration device makes the structure of the camera larger and more complicated. In addition, electrodes are provided at both sides the PZT vibrator. Such a design further complicates the structure.

Patent Publication JP 2007-82062 A discloses a camera, with which drops can be removed. In the camera, a piezoelectric member may be directly bonded to the external lens using an adhesive.

However, both of the Patent Publications are focused on the removal of only the water drops.

SUMMARY OF THE INVENTION

The disclosure aims to provide means for removing the foreign objects from a camera system instantly, which is directed to not only foreign objects of liquid state like water drops, but also foreign objects of gas state like fog and foreign objects of solid state like snow, ice, or the like.

In one aspect of the disclosure, a method for removing foreign substances from a camera system is provided. The camera system includes a camera device with a transparent cover and a soft sealing material surrounding the transparent cover. The transparent cover has a piezoelectric component. The method comprises the following steps. First, a type of the foreign substances is identified based on temperature, an image captured by the camera system, and a voltage change of the piezoelectric component. A sequence of frequencies is applied to the piezoelectric component and one or more resonant frequencies are acquired. Thereafter, the foreign substances are removed from the camera system. In this step, at least one vibration frequency and a vibration time period for the piezoelectric component are determined according to the identified type of the foreign substances. The vibration frequency is based on the one or more resonant frequencies. The piezoelectric component is driven with the vibration frequency and the vibration time period, such that at least a portion of the foreign substances are removed from the transparent cover through vibration of the piezoelectric component.

In another aspect of the disclosure, a camera system is provided. The camera system comprises a camera device and a frequency control unit. The camera device comprises an image sensor, a lens module, a transparent cover, and a soft sealing material. The lens module is disposed on the image sensor. The transparent cover is disposed on the lens module. The transparent cover comprises a piezoelectric component. The soft sealing material surrounds the transparent cover. The frequency control unit is coupled to the camera device. The frequency control unit controls a frequency of driving the piezoelectric component such that the piezoelectric component vibrates with at least one vibration frequency based on one or more resonant frequencies of the piezoelectric component to remove foreign substances from the transparent cover.

In the following detailed description, for purposes of explanation, numerous specific details are set forth in order to provide a thorough understanding of the disclosed embodiments. It will be apparent, however, that one or more embodiments may be practiced without these specific details. Elements and features of one embodiment may be beneficially incorporated into another embodiment without further recitation. In other instances, well-known structures and devices are schematically shown in order to simplify the drawing.

DETAILED DESCRIPTION OF THE PREFERRED EMBODIMENTS

Figure 1:
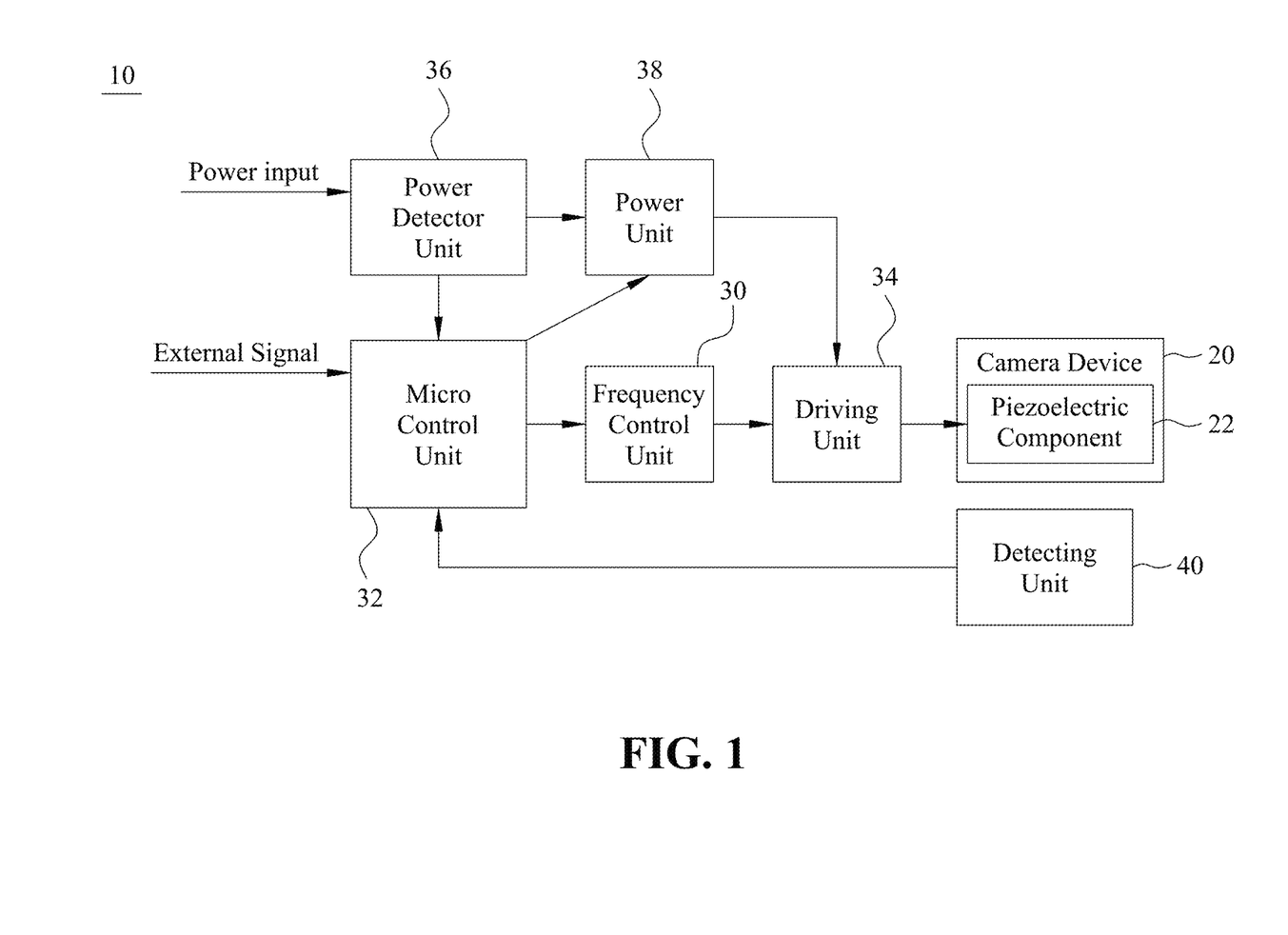
FIG. 1 illustrates an exemplary camera system.
Figure 2:
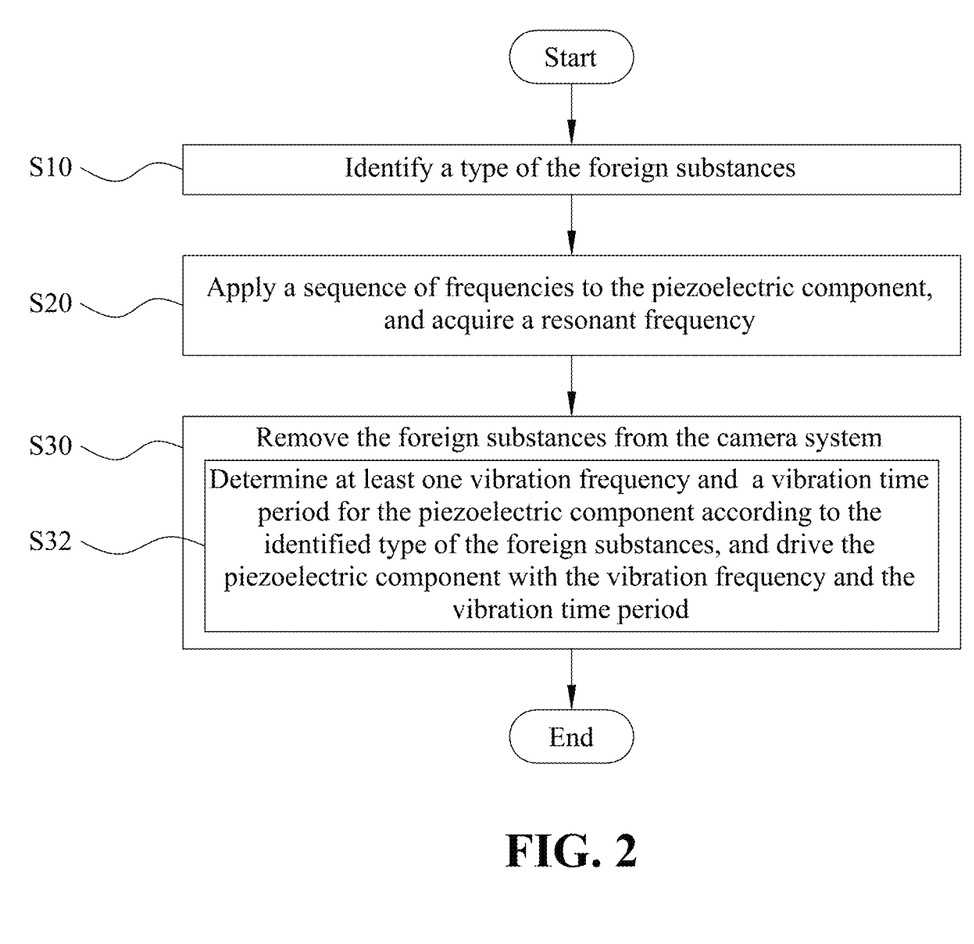
FIG. 2 is an exemplary flow diagram of a method for removing foreign substances from a camera system.

In this disclosure, a method for removing foreign substances from a camera system is provided. The camera system includes a camera device (20 in FIG. 1) with a transparent cover and a soft sealing material surrounding the transparent cover, and the transparent cover has a piezoelectric component (22 in FIG. 1). For ease of understanding, an exemplary camera system 10 is provided in FIG. 1 showing the communication and electrical connection of related units. Referring to FIG. 2, the method comprises steps S10, S20, and S30. In the step S10, a type of the foreign substances is identified based on temperature, an image captured by the camera system, and a voltage change of the piezoelectric component. In the step S20, a sequence of frequencies is applied to the piezoelectric component 22 and one or more resonant frequencies are acquired. In the step S30, the foreign substances are removed from the camera system 10, and particularly from the transparent cover. The step S30 comprises a step S32. In the step S32, at least one vibration frequency and a vibration time period for the piezoelectric component are determined according to the identified type of the foreign substances. The vibration frequency is based on the one or more resonant frequencies. The piezoelectric component is driven with the vibration frequency and the vibration time period, such that at least a portion of the foreign substances are removed from the transparent cover through vibration of the piezoelectric component 22.

More specifically, in the step S10, the foreign substances being fog, water, snow, frost, or ice may be identified based on the temperature.

The foreign substances being fog, water, snow, frost, or ice may be identified based on the image. For example, in some embodiments, an image can be captured by an image sensor of the camera system 10. Then, the image may be transmitted to a communication module through internet, Wi-Fi, ethernet, etc., and further uploaded to the clouds. Before the image is stored in the clouds, an analyzing algorithm using a deep learning algorithm may be processed to analyze the type of the foreign substances, such as a raindrop. In one embodiment, the communication module transmits a command to a micro control unit (MCU) 32, and the micro control unit 32 controls a frequency control unit 30 and a driving unit 34 to perform the following step S20.

Figure 3:
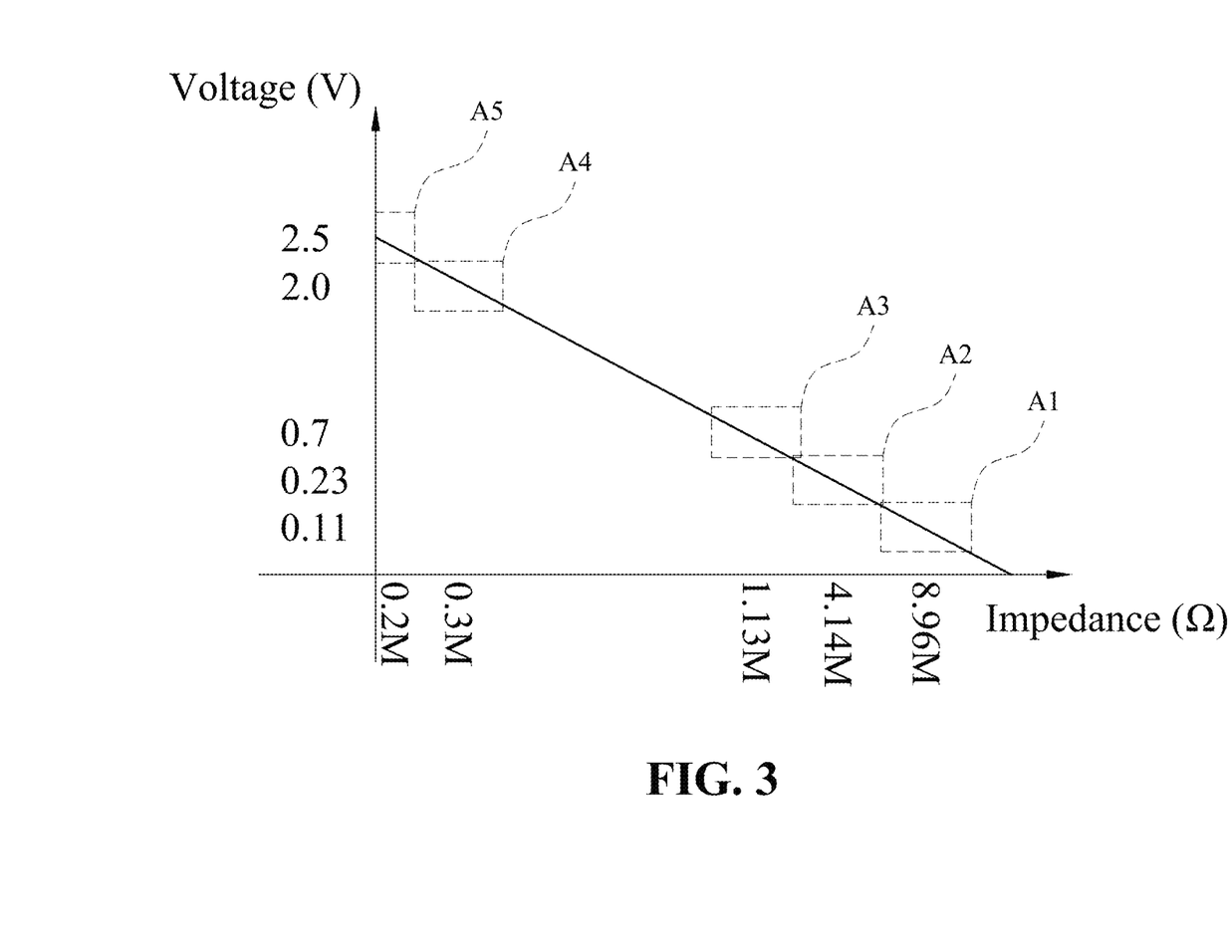
FIG. 3 is a voltage-impedance diagram of a piezoelectric component showing voltage changes due to foreign substances loaded on the piezoelectric component.

The foreign substances being ice, snow, a mixture of snow and water, water, or muddy water may be identified based on the voltage change of the piezoelectric component. This is because electrical characteristics of a piezoelectric component including voltage, working frequency, working impedance, and the like typically change as a foreign substance attaches, either directly or indirectly, to the piezoelectric component. Referring to FIG. 3, a voltage-impedance diagram of a piezoelectric component is shown. When the camera system is in an open environment with only air (and fog) around the camera system and on the transparent cover, the piezoelectric component has the highest impedance and the lowest ADC voltage. When there is ice on the transparent cover, the impedance and voltage change to an area A1. When there is snow on the transparent cover, the impedance and voltage change to an area A2. When there are both snow and water on the transparent cover, such as snow-broth, the impedance and voltage change to an area A3. When there is water on the transparent cover, the impedance and voltage change to an area A4. When there is muddy water on the transparent cover, the impedance and voltage change to an area A5. Therefore, in the step of identifying the type of the foreign substances on the transparent cover, when the voltage change is 0.08 V to 0.15 V, the foreign substances on the transparent cover can be identified as ice. When the voltage change is 0.2 V to 0.32 V, the foreign substances on the transparent cover can be identified as snow. When the voltage change is 0.7 V to 0.77 V, the foreign substances on the transparent cover can be identified as a mixture of snow and water. When the voltage change is 1.89 V to 2.16 V, the foreign substances on the transparent cover can be identified as water. When the voltage change is 2.26 V to 2.68 V, the foreign substances on the transparent cover can be identified as muddy water.

It can be understood that, in some embodiments, the step S10 may be started based on another external signal. In one embodiment, the step S10 is started based on an input from a user. In another embodiment, the camera system 10 is used on an vehicle, and the step S10 is started based on an operation signal of the wiper. The operation signal of the wiper may be transmitted to a micro control unit 32. A further identification for the transparent cover of the camera device 20 using a deep learning algorithm may be processed. For example, the identification may be an image analysis as described above and processed by an AI parallel processing element.

Figure 4:
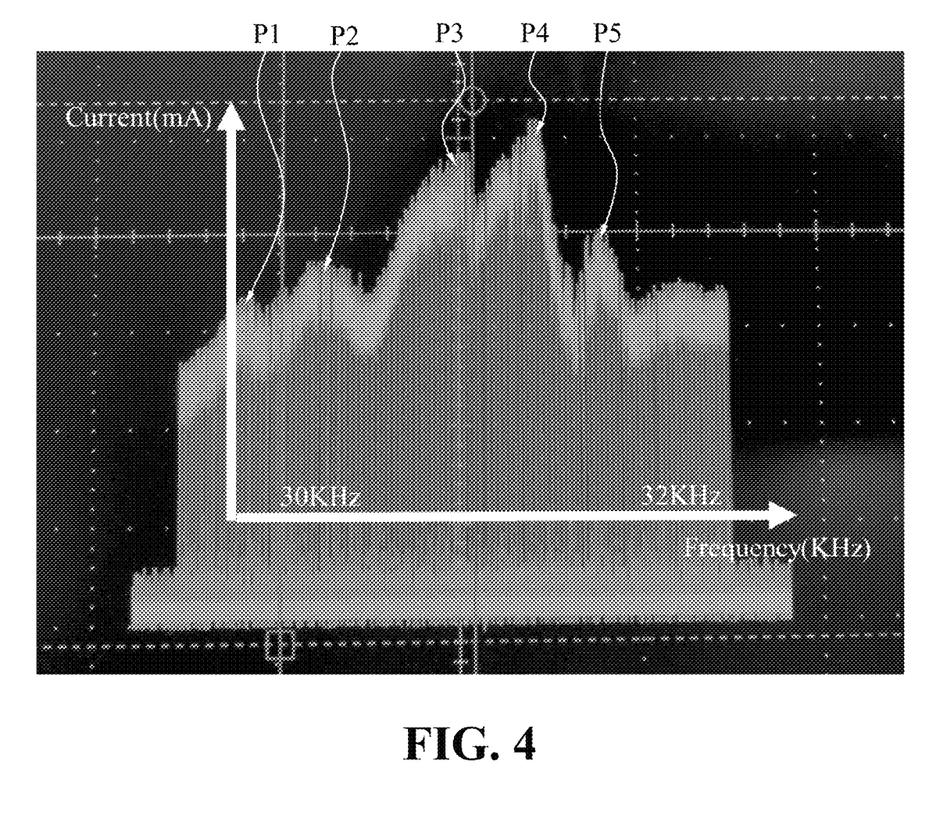
FIG. 4 is a current-frequency diagram of a piezoelectric component showing resonance of the piezoelectric component.

In the step S20, when the sequence of frequencies is applied to the piezoelectric component 22, a corresponding voltage or current may be measured for each frequency, and the measured results may be mapped on a diagram. From the diagram, a resonant point can be found. For example, in FIG. 4 showing a current-frequency relationship of a piezoelectric component, there are five points P1 (30.3 kHz, 160 mA), P2 (30.5 kHz, 170 mA), P3 (31 kHz, 230 mA), P4 (31.3 kHz, 260 mA), and P5 (31.5 kHz, 180 mA) corresponding to relative high currents, wherein the point P4 corresponding to the highest output current is the resonant point. The resonant frequency corresponding to the highest output current of the sequence of frequencies (such as the resonant frequency at the point P4) is used in the following step S30. When a scan range for the frequency is expanded, one or more resonant frequencies may be acquired. In some embodiments, since the resonant frequency of the piezoelectric component 22 changes as foreign substances attach thereto, for every time it is desired to drive the piezoelectric component to vibration and remove the foreign substances, the resonant frequency of the piezoelectric component 22 is measured. In some other embodiments, several times of the steps S30 may be carried on with only one time of the step S20, particularly when the several times of the steps S30 are carried on in a short interval.

The step S30 comprises the step S32 in which the piezoelectric component 22 is driven to vibrate. The vibration frequency may be in a frequency interval from 28 kHz to 1.4 MHz. The vibration of the piezoelectric component 22 may lead to at least one of shifting of the foreign substances on the transparent cover, bounce of the foreign substances on the transparent cover, temperature rising of the foreign substances on the transparent cover, atomization of the foreign substances on the transparent cover, or melting of the foreign substances on the transparent cover. Typically, a high frequency can lead to the atomization, melting, heating, or bounce of the foreign substances, and a low frequency can lead to the shifting of the foreign sub stances.

According to the identified type of the foreign substances, a resonant frequency that can lead to a suitable effect may be chosen as the vibration frequency, and thereby the foreign substances may be removed. For example, when the foreign substances are identified as fog, a resonant frequency leading to temperature rising of of the foreign substances is used as the vibration frequency, such that the fog is removed by heat caused by vibration of the piezoelectric component at the resonant frequency.

When the foreign substances are identified as ice, a first resonant frequency leading to melting of the foreign substances and a second resonant frequency leading to atomization of the foreign substances are used as the vibration frequencies, such that the ice is melted and forms water drops by vibration of the piezoelectric component at the first resonant frequency, and the water drops melted from the ice are atomized by vibration of the piezoelectric component at the second resonant frequency. Alternatively, an additional resonant frequency leading to shifting of the foreign substances may be used before the atomization. In other words, a first resonant frequency leading to melting of the foreign substances, a second resonant frequency leading to shifting of the foreign substances, and a third resonant frequency leading to atomization of the foreign substances are used as the vibration frequencies, such that the ice is melted and forms water drops by vibration of the piezoelectric component at the first resonant frequency, the water drops melted from the ice are shifted and collected to form larger drops by vibration of the piezoelectric component at the second resonant frequency, and the larger drops are atomized by vibration of the piezoelectric component at the third resonant frequency.

When the foreign substances are identified as snow, a first resonant frequency leading to melting of the foreign substances and a second resonant frequency leading to atomization of the foreign substances are used as the vibration frequencies, such that the snow is melted and forms water drops by vibration of the piezoelectric component at the first resonant frequency, and the water drops melted from the ice are atomized by vibration of the piezoelectric component at the second resonant frequency. Alternatively, a first resonant frequency leading to melting of the foreign substances, a second resonant frequency leading to shifting of the foreign substances, and a third resonant frequency leading to atomization of the foreign substances are used as the vibration frequencies, such that the snow is melted and forms water drops by vibration of the piezoelectric component at the first resonant frequency, the water drops melted from the snow are shifted and collected to form larger drops by vibration of the piezoelectric component at the second resonant frequency, and the larger drops are atomized by vibration of the piezoelectric component at the third resonant frequency.

When the foreign substances are identified as a mixture of snow and water, a first resonant frequency leading to melting of the foreign substances and a second resonant frequency leading to atomization of the foreign substances are used as the vibration frequencies, such that the snow is melted and forms water drops by vibration of the piezoelectric component at the first resonant frequency, drops of the water and the water drops melted from the snow are atomized by vibration of the piezoelectric component at the second resonant frequency. Alternatively, a first resonant frequency leading to melting of the foreign substances, a second resonant frequency leading to shifting of the foreign substances, and a third resonant frequency leading to atomization of the foreign substances are used as the vibration frequencies, such that the snow is melted and forms water drops by vibration of the piezoelectric component at the first resonant frequency, drops of the water and the water drops melted from the snow are shifted and collected to form larger drops by vibration of the piezoelectric component at the second resonant frequency, and the larger drops are atomized by vibration of the piezoelectric component at the third resonant frequency.

When the foreign substances are identified as water, a resonant frequency leading to atomization of the foreign substances is used as the vibration frequency, such that drops of the water are atomized by vibration of the piezoelectric component at the resonant frequency. Alternatively, a first resonant frequency leading to shifting of the foreign substances and a second resonant frequency leading to atomization of the foreign substances are used as the vibration frequencies, such that drops of the water are shifted and collected to form larger drops by vibration of the piezoelectric component at the first resonant frequency, and the larger drops are atomized by vibration of the piezoelectric component at the second resonant frequency.

When the foreign substances are identified as muddy water, a resonant frequency leading to atomization of the foreign substances is used as the vibration frequency, such that drops of the muddy water are atomized by vibration of the piezoelectric component at the resonant frequency. Alternatively, a first resonant frequency leading to shifting of the foreign substances and a second resonant frequency leading to atomization of the foreign substances are used as the vibration frequencies, such that drops of the muddy water are shifted and collected to form larger drops by vibration of the piezoelectric component at the first resonant frequency, and the larger drops are atomized by vibration of the piezoelectric component at the second resonant frequency.

For ease of operation, in some embodiments, a frequency interval including the specific vibration frequency corresponding to the resonant frequency may be used directly to drive the vibration of the piezoelectric component. For a further understanding of the step S32, Embodiments E1-E6 are provided in Table 1 hereinafter.

TABLE 1

| | Col. 1<br>Voltage Change | Col. 2<br>Foreign Substances | Col. 3<br>Vibration Frequency | Col. 4<br>Image Clearance (MTF) | Col. 5<br>Mechanism |
|---|---|---|---|---|---|
| E1 | 0 V | None/Fog | 1.0 MHz-1.4 MHz | 0.491 | Defogging by Heating |
| E2 | 0.08 V-0.15 V | Ice | 28 kHz-1.4 MHz | 0.483 | (1) Melting of ice<br>(2) Shifting and Collection of Water Drops<br>(3) Atomization of Water Drops |
| E3 | 0.2 V-0.32 V | Snow | 28 kHz-1.4 MHz | 0.487 | (1) Melting of Snow<br>(2) Shifting and Collection of Water Drops<br>(3) Atomization of Water Drops |
| E4 | 0.7 V-0.77 V | Snow Water | 28 kHz-1.4 MHz | 0.492 | (1) Melting of Snow<br>(2) Shifting and Collection of Water Drops<br>(3) Atomization of Water Drops |
| E5 | 1.89 V-2.16 V | Water | 28 kHz-45 kHz | 0.49 | (1) Shifting and Collection of Water Drops<br>(2) Atomization of Water Drops |

TABLE 1-continued

| | Col. 1<br>Voltage Change | Col. 2<br>Foreign Substances | Col. 3<br>Vibration Frequency | Col. 4<br>Image Clearance (MTF) | Col. 5<br>Mechanism |
|---|---|---|---|---|---|
| E6 | 2.26 V-2.68 V | Muddy Water | 28 kHz-45 kHz | 0.479 | (1) Shifting and Collection of Water Drops<br>(2) Atomization of Water Drops |

In Embodiments E1-E6, a PZT (lead zirconium titanate) component is used in a camera system. For each of Embodiments E1-E6, the voltage of the PZT component is measured by ADC and the voltage change is listed in Column 1. The type of the foreign substances is identified as above and listed in Column 2. Then, the PZT component is driven to vibrate with a frequency interval listed in Column 3. After the vibration, the clearance of the transparent cover having the PZT component is evaluated by an image clearance as listed in Column 4. In addition, the mechanism of the PZT component during the removal of the foreign substances is listed in Column 5. As shown in Table 1, in each of Embodiments E2-E5, a combined vibration mode is applied to the PZT component. For example, in Embodiment E2, due to the different vibration frequencies during the removal of the foreign substances, ice is melted by heat at first, the water drops melted from ice are then shifted and collected to form larger drops, finally the larger drops are atomized, and thereby ice is removed from the transparent cover. It can be seen from Table 1, all of Embodiments E1-E6 can regain good image quality after the foreign substances are removed using the method according to the disclosure. As such, the frequency interval from 28 kHz to 1.4 MHz may be suitable for the step S32. For ease of device settings, a frequency interval from 20 kHz to 1.4 MHz may be applied.

It can be understood that the removal of the foreign substances can be achieved by other ways. For example, the step S30 may further comprise heating the transparent cover, washing the transparent cover using a water jet, or the like.

Now the disclosure is directed to a camera system which can be used to implement the method for removing foreign substances from a camera system as described above. Referring back to FIG. 1, the camera system 10 comprises a camera device 20 and a frequency control unit 30. The camera device 20 comprises an image sensor, a lens module, a transparent cover, and a soft sealing material. The lens module is disposed on the image sensor. The transparent cover is disposed on the lens module. The transparent cover comprises a piezoelectric component 22. The soft sealing material surrounds the transparent cover. The frequency control unit 30 is coupled to the camera device 20, particularly to the piezoelectric component 22. The frequency control unit 30 controls a frequency of driving the piezoelectric component 22 such that the piezoelectric component 22 vibrates with at least one vibration frequency based on one or more resonant frequencies of the piezoelectric component 22 to remove foreign substances from the transparent cover.

According to some embodiments, the camera system 10 may further comprise a micro control unit 32 coupled to the frequency control unit 30. The micro control unit 32 receives an external signal, which may be from another unit of the camera system 10 (such as the detecting unit 40) or from outside of the camera system 10. The camera system 10 may further comprise a driving unit 34 coupled to the frequency control unit 30 and the piezoelectric component 22. The driving unit 34 drives the piezoelectric component 22 in response to a command from the frequency control unit 30. According to some embodiments, the camera system 10 may further comprise a power detector unit 36 coupled to the micro control unit 32. The power detector unit 36 receives a power input. The camera system 10 may further comprise a power unit 38 coupled to the micro control unit 32 and the driving unit 34. According to some embodiments, the camera system 10 may further comprise one or more detecting units 40 coupled to the micro control unit 32. The detecting unit 40 may be an additional temperature detector, an additional water drop detector, etc. Additional or alternatively, the detecting unit 40 may be the camera device 20 itself (identification based on the image) or the piezoelectric component 22 (identification based on the voltage change). In one embodiment, the detecting unit 40 provides the external signal to the micro control unit 32.

Hereinafter, structural details of the camera system according to the disclosure will be illustrated with reference to the drawings. Since the following description is focused on the structural features, some units described above with reference to FIG. 1 may not be further illustrated. However, it can be understood that such units may be incorporated in the camera device (200 in FIG. 5) or arranged outside of the camera device (200 in FIG. 5), without particular limits. It can be understood that spatial orientations and relative positions of components will be changed as the rotation of the camera system.

Figure 5:
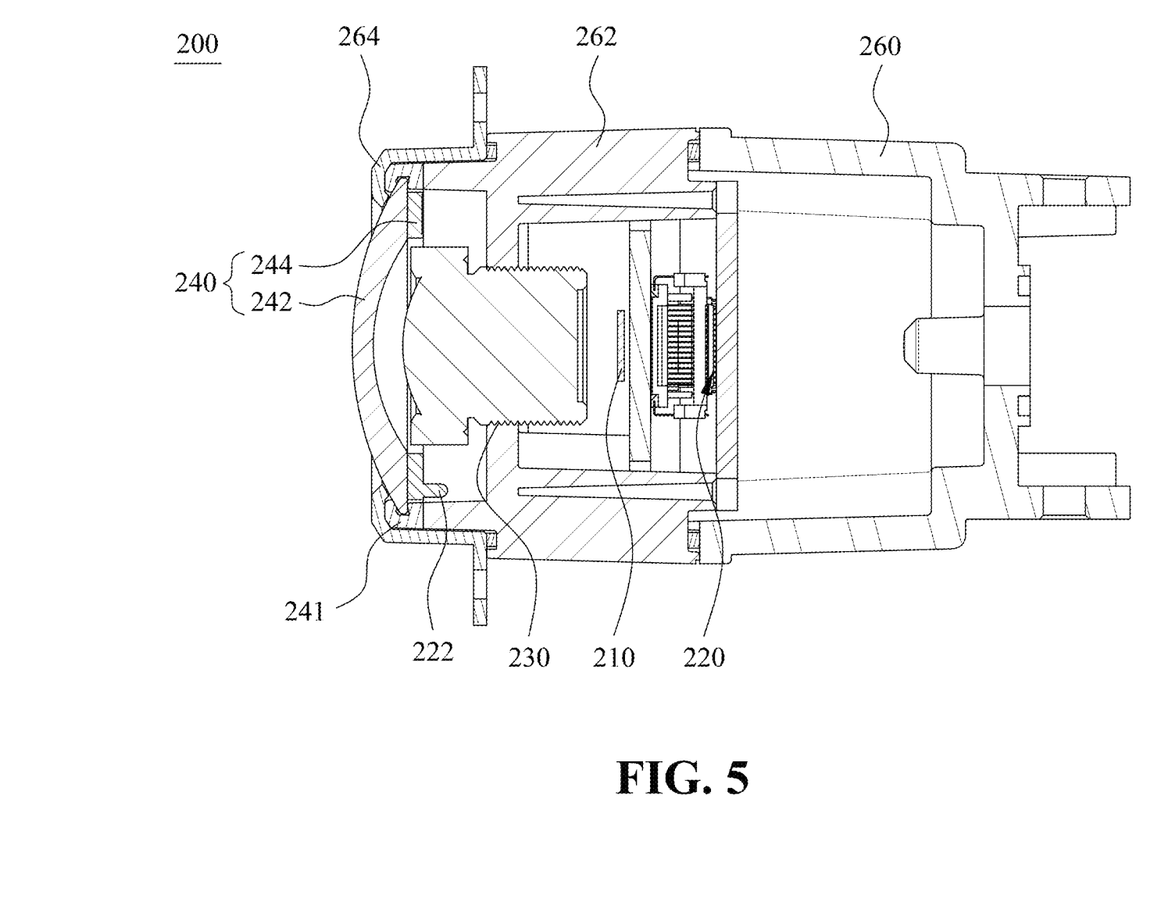
FIG. 5 illustrates an exemplary camera device.

Referring to FIG. 5, the camera device 200 is illustrated in details. The camera device 200 comprises an image sensor 210. The camera device 200 may further comprise a circuit board 220 coupled with the image sensor 210. The camera device 200 comprises a lens module 230 disposed on the image sensor 210. The camera device 200 comprises a transparent cover 240 disposed on the lens module 230. The camera device 200 comprises a soft sealing material 241 surrounding the transparent cover 240. The soft sealing material 241 may be water-proof, and be provided to the transparent cover 240 by pressing from upper and lower sides, such that the soft sealing material 241 encapsulates the transparent cover 240 at least at a side thereof. One or more soft sealing materials 241 may be disposed. The soft sealing material 241 may be silicone, water-proof ring, sealing ring, or the like, but is not limited thereto. The transparent cover 240 comprises a transparent substrate 242 and a piezoelectric component 244. The transparent substrate 242 may be formed of glass or plastic. The piezoelectric component 244 comprises a piezoelectric material, such as PZT or the like. As shown in FIG. 5, the piezoelectric component 244 may be disposed under the transparent substrate 242, such that the foreign substances can be removed in a more efficiency and component-saving manner. The piezoelectric component 244 may have a ring shape. The piezoelectric component 244 may be disposed around a periphery of the lens module 230. The piezoelectric component 244 may be attached to the transparent substrate 242 using an adhesive with good tensile characteristics, a high Young's modulus, and a low hygroscopicity. The piezoelectric component 244 may be coupled to the circuit board 220 by a cable 222. More specifically, the circuit board 220 may comprise a camera board, a power board and a driver board for the piezoelectric component 244. According to some embodiments, the camera device 200 may further comprise a first lid 260, a lens module holder 262, and a second lid 264. O-rings may be provided between the lens module holder 262 and the second lid 264 for sealing.

Figure 6:
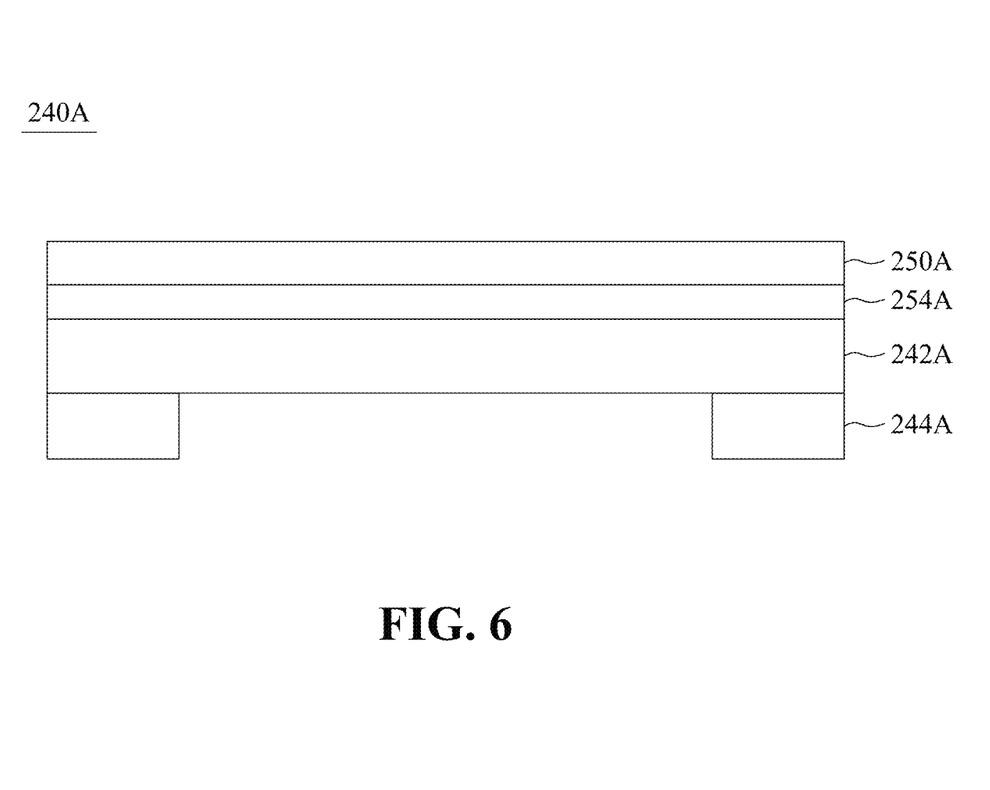
FIG. 6 illustrates an exemplary transparent cover.
Figure 7:
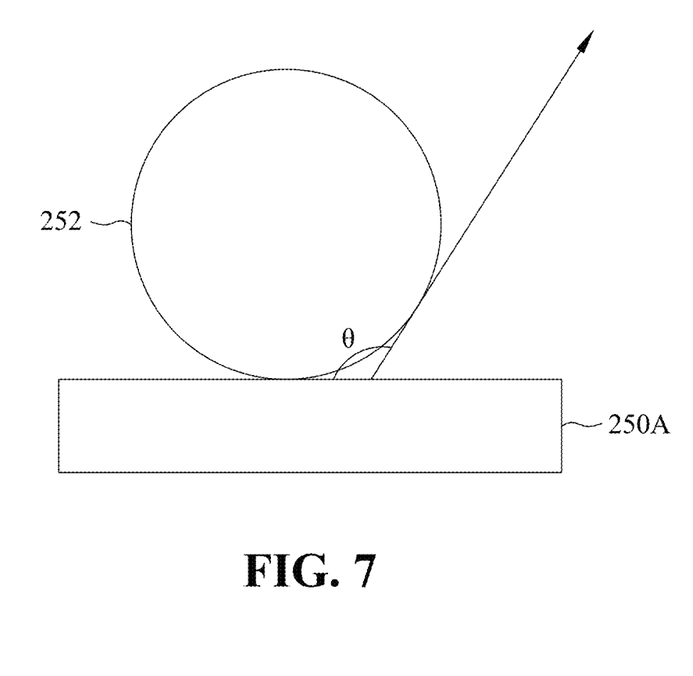
FIG. 7 illustrates the hydrophobicity of an exemplary hydrophobic layer.

FIG. 6 shows another example of the transparent cover. The transparent cover 240A comprises a transparent substrate 242A and a piezoelectric component 244A, which are substantially the same as the transparent substrate 242 and the piezoelectric component 244. The transparent cover 240A may further comprise a hydrophobic layer 250A disposed on the transparent substrate 242A. The hydrophobic layer 250A is beneficial for reducing the water adhesion. When the water is sprayed on the transparent cover 240A, water drops will be formed. Preferably, as shown in FIG. 7, a contact angle θ between the hydrophobic layer 250A and water 252 is larger than 85°, such as 110°. The transparent cover 240A may further comprise an anti-reflective layer 254A for increasing the transmittance. The anti-reflective layer 254A may be disposed on the transparent substrate 242A, and the hydrophobic layer 250A may be disposed on the anti-reflective layer 254A.

Figure 8A:
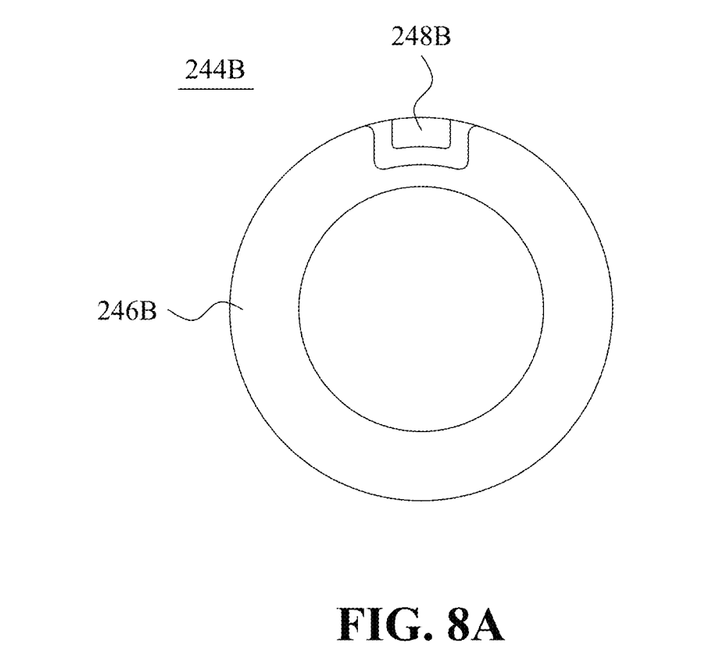
FIGS. 8A and 8B illustrate exemplary piezoelectric components, respectively.
Figure 8B:
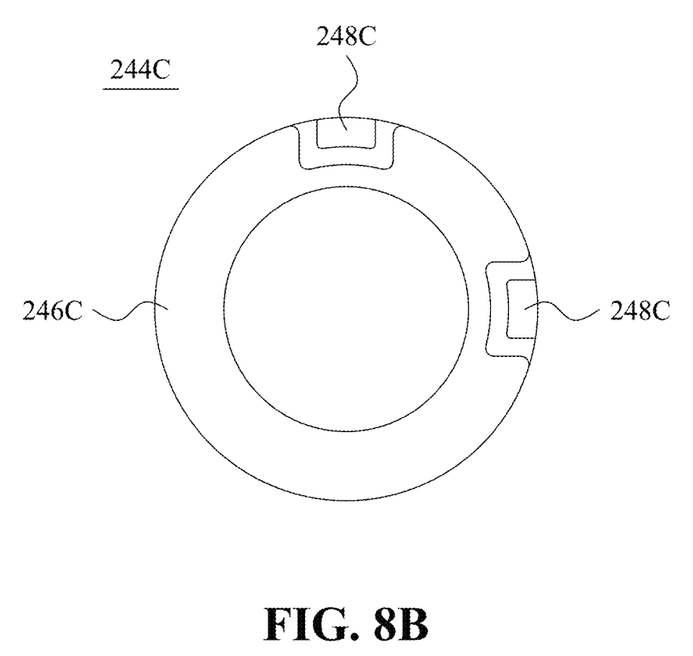

The piezoelectric component 244A may comprise a piezoelectric material and one or more electrodes disposed on the piezoelectric material in a non-evenly distributed manner. An example is illustrated in FIG. 8A, the piezoelectric component 244B comprises a piezoelectric material 246B arranged as a layer having the ring shape and an electrode 248B disposed on the piezoelectric material 246B, wherein the electrode 248B is disposed on only a portion of the piezoelectric material 246B. Another example is illustrated in FIG. 8B, the piezoelectric component 244C comprises a piezoelectric material 246C arranged as a layer having the ring shape and two electrodes 248C disposed on the piezoelectric material 246C, wherein each electrode 248C is disposed on only a portion of the piezoelectric material 246C, and lines connecting a center of the piezoelectric component 244C and the two electrodes 248C form an angle of about 90°.

Figure 9:
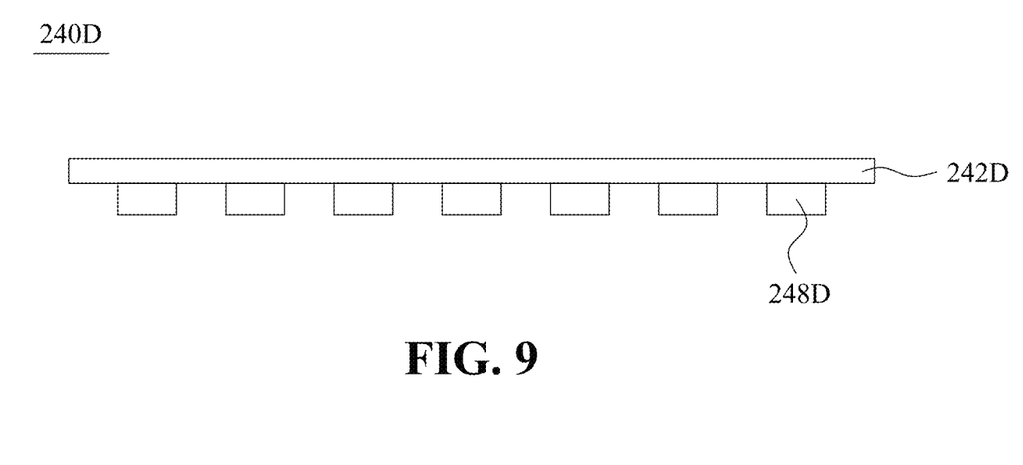
FIG. 9 illustrates an exemplary transparent cover.

FIG. 9 shows still another example of the transparent cover. The transparent cover 240D comprises a transparent substrate 242D and a piezoelectric component. The piezoelectric component comprises a piezoelectric material incorporated into the transparent substrate 242D and a plurality of electrodes 248D disposed in parallel under the transparent substrate 242D.

In some embodiments, the c detecting unit 40 may be a water drop detector with a plurality of sensing points disposed around the camera device 200.

The camera system according to the disclosure can be used as an electric side mirror or other applications on vehicles, or other applications other than those on vehicles, such as surveillance cameras or the like.

The method and the camera system according to the disclosure can be used to remove the foreign objects from the camera system instantly, such as in few minutes, or even in few seconds. Therefore, clear images can be sustained, and the camera system can be used with a good image quality even when muddy water is sprayed onto the camera system or the car is driven in a bad weather, such as rain, snow, fog, or the like. When the camera system is used on vehicles, this is particularly beneficial for driving safety.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for removing foreign substances from a camera system, the camera system including a camera device with a transparent cover and a soft sealing material surrounding the transparent cover, the transparent cover having a piezoelectric component, the method comprising:
   identifying a type of the foreign substances based on temperature, an image captured by the camera system, and a voltage change of the piezoelectric component;
   applying a sequence of frequencies to the piezoelectric component and acquiring one or more resonant frequencies; and
   removing the foreign substances from the camera system, comprising:
   determining at least one vibration frequency, which is based on the one or more resonant frequencies, and a vibration time period for the piezoelectric component according to the identified type of the foreign substances, and driving the piezoelectric component with the vibration frequency and the vibration time period, such that at least a portion of the foreign substances are removed from the transparent cover through vibration of the piezoelectric component.

2. The method according to claim 1, wherein in said identifying a type of the foreign substances, the foreign substances being fog, water, snow, frost, or ice are identified based on the temperature.

3. The method according to claim 1, wherein in said identifying a type of the foreign substances, the foreign substances being fog, water, snow, frost, or ice are identified based on the image.

4. The method according to claim 3, wherein an analyzing algorithm using a deep learning algorithm is processed to analyze the type of the foreign substances in the image.

5. The method according to claim 1, wherein in said identifying a type of the foreign substances, the foreign substances being ice, snow, a mixture of snow and water, water, or muddy water are identified based on the voltage change of the piezoelectric component.

6. The method according to claim 5, wherein:
   when the voltage change is 0.08 V to 0.15 V, the foreign substances on the transparent cover are identified as ice;
   when the voltage change is 0.2 V to 0.32 V, the foreign substances on the transparent cover are identified as snow;
   when the voltage change is 0.7 V to 0.77 V, the foreign substances on the transparent cover are identified as the mixture of snow and water;
   when the voltage change is 1.89 V to 2.16 V, the foreign substances on the transparent cover are identified as water; and
   when the voltage change is 2.26 V to 2.68 V, the foreign substances on the transparent cover are identified as muddy water.

7. The method according to claim 1, wherein the vibration frequency is in a frequency interval from 20 kHz to 1.4 MHz.

8. The method according to claim 1, wherein in said removing the foreign substances from the camera system, the vibration of the piezoelectric component leads to at least one of shifting of the foreign substances on the transparent cover, bounce of the foreign substances on the transparent cover, temperature rising of the foreign substances on the transparent cover, atomization of the foreign substances on the transparent cover, or melting of the foreign substances on the transparent cover.

9. The method according to claim 1, wherein in said removing the foreign substances from the camera system:
when the foreign substances are identified as fog, a resonant frequency leading to temperature rising of the of the foreign substances is used as the vibration frequency, such that the fog is removed by heat caused by vibration of the piezoelectric component at the resonant frequency;
when the foreign substances are identified as ice, a first resonant frequency leading to melting of the foreign substances and a second resonant frequency leading to atomization of the foreign substances are used as the vibration frequencies, such that the ice is melted and forms water drops by vibration of the piezoelectric component at the first resonant frequency, and the water drops melted from the ice are atomized by vibration of the piezoelectric component at the second resonant frequency;
when the foreign substances are identified as snow, a first resonant frequency leading to melting of the foreign substances and a second resonant frequency leading to atomization of the foreign substances are used as the vibration frequencies, such that the snow is melted and forms water drops by vibration of the piezoelectric component at the first resonant frequency, and the water drops melted from the ice are atomized by vibration of the piezoelectric component at the second resonant frequency;
when the foreign substances are identified as a mixture of snow and water, a first resonant frequency leading to melting of the foreign substances and a second resonant frequency leading to atomization of the foreign substances are used as the vibration frequencies, such that the snow is melted and forms water drops by vibration of the piezoelectric component at the first resonant frequency, drops of the water and the water drops melted from the snow are atomized by vibration of the piezoelectric component at the second resonant frequency;
when the foreign substances are identified as water, a resonant frequency leading to atomization of the foreign substances is used as the vibration frequency, such that drops of the water are atomized by vibration of the piezoelectric component at the resonant frequency; and
when the foreign substances are identified as muddy water, a resonant frequency leading to atomization of the foreign substances is used as the vibration frequency, such that drops of the muddy water are atomized by vibration of the piezoelectric component at the resonant frequency.

10. The method according to claim 1, wherein in said removing the foreign substances from the camera system:
when the foreign substances are identified as fog, a resonant frequency leading to temperature rising of the of the foreign substances is used as the vibration frequency, such that the fog is removed by heat caused by vibration of the piezoelectric component at the resonant frequency;
when the foreign substances are identified as ice, a first resonant frequency leading to melting of the foreign substances, a second resonant frequency leading to shifting of the foreign substances, and a third resonant frequency leading to atomization of the foreign substances are used as the vibration frequencies, such that the ice is melted and forms water drops by vibration of the piezoelectric component at the first resonant frequency, the water drops melted from the ice are shifted and collected to form larger drops by vibration of the piezoelectric component at the second resonant frequency, and the larger drops are atomized by vibration of the piezoelectric component at the third resonant frequency;
when the foreign substances are identified as snow, a first resonant frequency leading to melting of the foreign substances, a second resonant frequency leading to shifting of the foreign substances, and a third resonant frequency leading to atomization of the foreign substances are used as the vibration frequencies, such that the snow is melted and forms water drops by vibration of the piezoelectric component at the first resonant frequency, the water drops melted from the snow are shifted and collected to form larger drops by vibration of the piezoelectric component at the second resonant frequency, and the larger drops are atomized by vibration of the piezoelectric component at the third resonant frequency;
when the foreign substances are identified as a mixture of snow and water, a first resonant frequency leading to melting of the foreign substances, a second resonant frequency leading to shifting of the foreign substances, and a third resonant frequency leading to atomization of the foreign substances are used as the vibration frequencies, such that the snow is melted and forms water drops by vibration of the piezoelectric component at the first resonant frequency, drops of the water and the water drops melted from the snow are shifted and collected to form larger drops by vibration of the piezoelectric component at the second resonant frequency, and the larger drops are atomized by vibration of the piezoelectric component at the third resonant frequency;
when the foreign substances are identified as water, a first resonant frequency leading to shifting of the foreign substances and a second resonant frequency leading to atomization of the foreign substances are used as the vibration frequencies, such that drops of the water are shifted and collected to form larger drops by vibration of the piezoelectric component at the first resonant frequency, and the larger drops are atomized by vibration of the piezoelectric component at the second resonant frequency; and
when the foreign substances are identified as muddy water, a first resonant frequency leading to shifting of the foreign substances and a second resonant frequency leading to atomization of the foreign substances are used as the vibration frequencies, such that drops of the muddy water are shifted and collected to form larger drops by vibration of the piezoelectric component at the first resonant frequency, and the larger drops are atomized by vibration of the piezoelectric component at the second resonant frequency.

11. The method according to claim 1, wherein said removing the foreign substances from the camera system further comprises:
heating the transparent cover; or
washing the transparent cover using a water jet.

12. A camera system, comprising:
a camera device, comprising:
an image sensor;
a lens module disposed on the image sensor;

a transparent cover disposed on the lens module, the transparent cover comprising a piezoelectric component; and
a soft sealing material surrounding the transparent cover; and
a frequency control unit coupled to the camera device, the frequency control unit controlling a frequency of driving the piezoelectric component such that the piezoelectric component vibrates with at least one vibration frequency based on one or more resonant frequencies of the piezoelectric component to remove foreign substances from the transparent cover;
wherein the transparent cover comprises:
a transparent substrate;
the piezoelectric component disposed under the transparent substrate; and
a hydrophobic layer disposed on the transparent substrate, wherein a contact angle between the hydrophobic layer and water is larger than 85°.

13. The camera system according to claim 12, wherein the transparent cover further comprises:
an anti-reflective layer disposed on the transparent substrate, wherein the hydrophobic layer is disposed on the anti-reflective layer.

14. The camera system according to claim 12, wherein the piezoelectric component has a ring shape, and the piezoelectric component is disposed around a periphery of the lens module.

15. The camera system according to claim 14, wherein the piezoelectric component comprises:
a piezoelectric material arranged as a layer having the ring shape; and
one or more electrodes disposed on the piezoelectric material in a non-evenly distributed manner.

16. The camera system according to claim 12, wherein the piezoelectric component comprises:
a piezoelectric material incorporated into the transparent substrate; and
a plurality of electrodes disposed in parallel under the transparent substrate.

17. The camera system according to claim 12, further comprising:
a micro control unit coupled to the frequency control unit, the micro control unit receiving an external signal; and
a driving unit coupled to the frequency control unit and the piezoelectric component, the driving unit driving the piezoelectric component in response to a command from the frequency control unit.

18. The camera system according to claim 17, further comprising:
one or more detecting units coupled to the micro control unit, wherein the detecting unit provides the external signal to the micro control unit.

* * * * *